Figure 1:
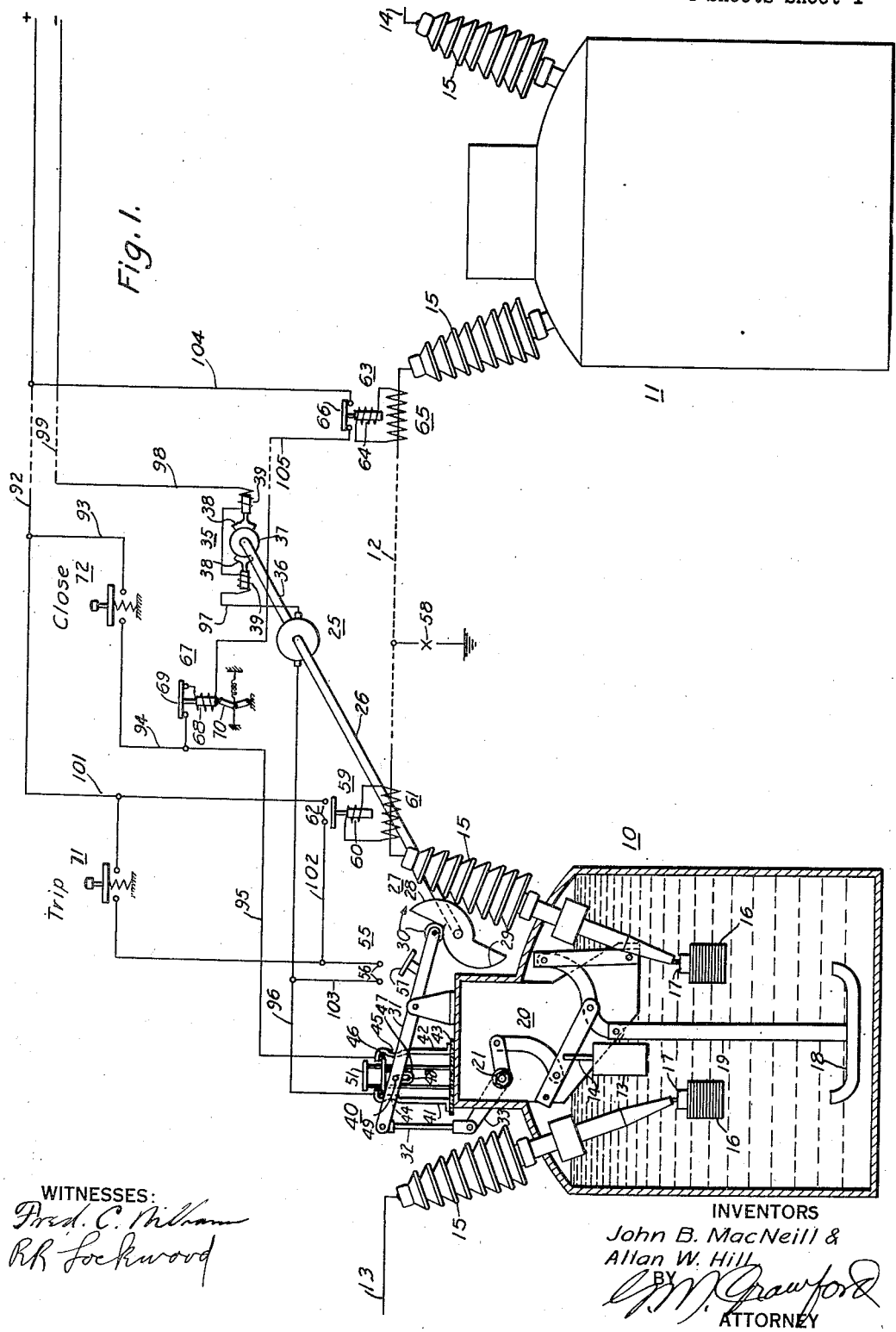

Aug. 2, 1938.   J. B. MacNEILL ET AL   2,125,835
CIRCUIT BREAKER
Filed Nov. 29, 1933   4 Sheets-Sheet 4

WITNESSES:

INVENTORS
John B. MacNeill &
Allan W. Hill
BY
ATTORNEY

Patented Aug. 2, 1938

2,125,835

UNITED STATES PATENT OFFICE

2,125,835

CIRCUIT BREAKER

John B. MacNeill and Allan W. Hill, Wilkinsburg, Pa., assignors to Westinghouse Electric & Manufacturing Company, East Pittsburgh, Pa., a corporation of Pennsylvania Application November 29, 1933, Serial No. 700,276

22 Claims. (Cl. 175—294)

Our invention relates, generally, to circuit breakers for electrical transmission systems and it has particular relation to the control of the operation of such circuit breakers.

Our copending application Serial No. 216,724, filed June 30, 1938, is a division of the present application.

When two electrical systems are connected by means of a relatively long, high voltage transmission line, it is especially desirable that they remain permanently connected together during the time when power is being transferred between the two systems. This condition is particularly desirable when there is synchronous apparatus located at both ends of the transmission line. In the event that the line connecting the stations should become opened for any reason, there is the likelihood that the apparatus at each station will get out of step or out of synchronism with the apparatus at the other station with the result that it is necessary to resynchronize the system, an operation which may require considerable time and possibly necessitate the dropping of a portion of the load.

This situation is rendered more acute in a transmission system which obtains electrical power from a relatively large water power generating plant, which power is transmitted over a transmission line several hundred miles long to a distribution system such as would be used for supplying power to a municipality. In such a system, there ordinarily will be a generating plant located at the municipality but usually its capacity will not be sufficiently great to supply the entire load demand in the event that the main water power plant is disconnected from the transmission line.

In the event of a fault necessitating the removal of the water power plant from the transmission line for a considerable length of time, the generators at the plant will immediately tend to overspeed due to the removal of load. It is very difficult to reduce the speed of the generators by governing devices because of the difficulty involved in controlling rapidly the immense flow of water which is required for driving generators of large capacity. Considering a 60 cycle system, the generators may easily overspeed to possibly 65 cycles thereby rendering it impossible to synchronize them with the power system without shutting down the entire system.

The ordinary fault which occurs on a transmission line usually consists of an ionized state which will rapidly disappear in the event that the ionizing potential is removed from the transmission line. Under ordinary conditions, this ionized state will disappear at the end of a few half cycles of the alternating current. Thus, if the transmission line were disconnected from all of the sources of potential for possibly one whole cycle, the fault may disappear and, if the potentials were again immediately applied to the transmission line, normal operating conditions could be resumed.

If suitable control apparatus is provided for opening the circuit breakers connecting the sources of potential to the transmission line for one or two cycles and if they are then reclosed at the end of this period, the natural inertia of the two systems will be sufficiently great to maintain them in synchronism during this interval and will permit their being reconnected at the termination thereof without loss of synchronism. It has been found that, under certain conditions, the system may be disconnected for a greater number of cycles and may still be reconnected to obtain stable operation without incurring any serious difficulties.

We have found, as the result of extensive tests, that the arc is normally extinguished in a high voltage circuit breaker after the contact members have been separated for only a fractional part of the entire distance through which they may be separated. Thus, in a particular instance when the travel of the movable contact member is 44 inches, it has been found that the arc will be extinguished after the movable contact member has travelled 10 inches. Therefore, if the fault on the line has been cleared when the movable contact member has travelled 10 inches, the circuit breaker may be immediately reclosed and the fault will have been cleared. However, it has been found desirable to use a certain factor of safety and, therefore, it is desirable to permit the movable contact member to travel a greater distance, in this instance 14 inches, in order to insure that the arc will be extinguished.

It is not only desirable that the arc be extinguished at the circuit breaker under consideration, but it is also desirable that there be no current flow from the other end of the transmission system into the fault. Otherwise, it would be of no avail to reclose the circuit breaker, since the fault would still be on the line.

It is, therefore, desirable to provide for reclosing the circuit breaker not ony when the movable contact member has travelled to such a position that the arc will be extinguished but it is also desirable to provide for the reclosure only when it is certain that the other end of the transmission line has also been opened to entirely clear the fault.

In view of the foregoing, therefore, the object of our invention generally stated is to provide reclosing apparatus for a circuit breaker which shall be simple and efficient in operation and which may be readily and economically manufactured and installed.

The principal object of our invention is to provide for reclosing a circuit breaker before it has been actuated to the full open position.

Another important object of our invention is to provide for reclosing a circuit breaker when the movable contact member thereof has reached a predetermined position in its path of travel and before it has reached the full open position.

Another object of our invention is to provide for initiating the reclosure of a circuit breaker when it has been opened to a predetermined point and on the existence of a predetermined condition at the far end of the transmission line to which the circuit breaker is connected.

A further object of our invention is to provide for reducing the speed of opening of a circuit breaker at a predetermined point in the path of travel of the movable contact member.

A still further object of our invention is to provide for extinguishing the arc drawn in a circuit breaker and for reclosing it as soon as the arc is extinguished and before the movable contact member has been actuated to the full open position.

Other objects of our invention will in part be obvious and in part appear hereinafter.

Our invention, accordingly, is disclosed in the embodiment hereof shown in the accompanying drawings and comprises the features of construction, the combination of elements and arrangement of parts which will be exemplified in a construction hereinafter set forth and the scope of the application of which will be indicated in the appended claims.

Figure 2:
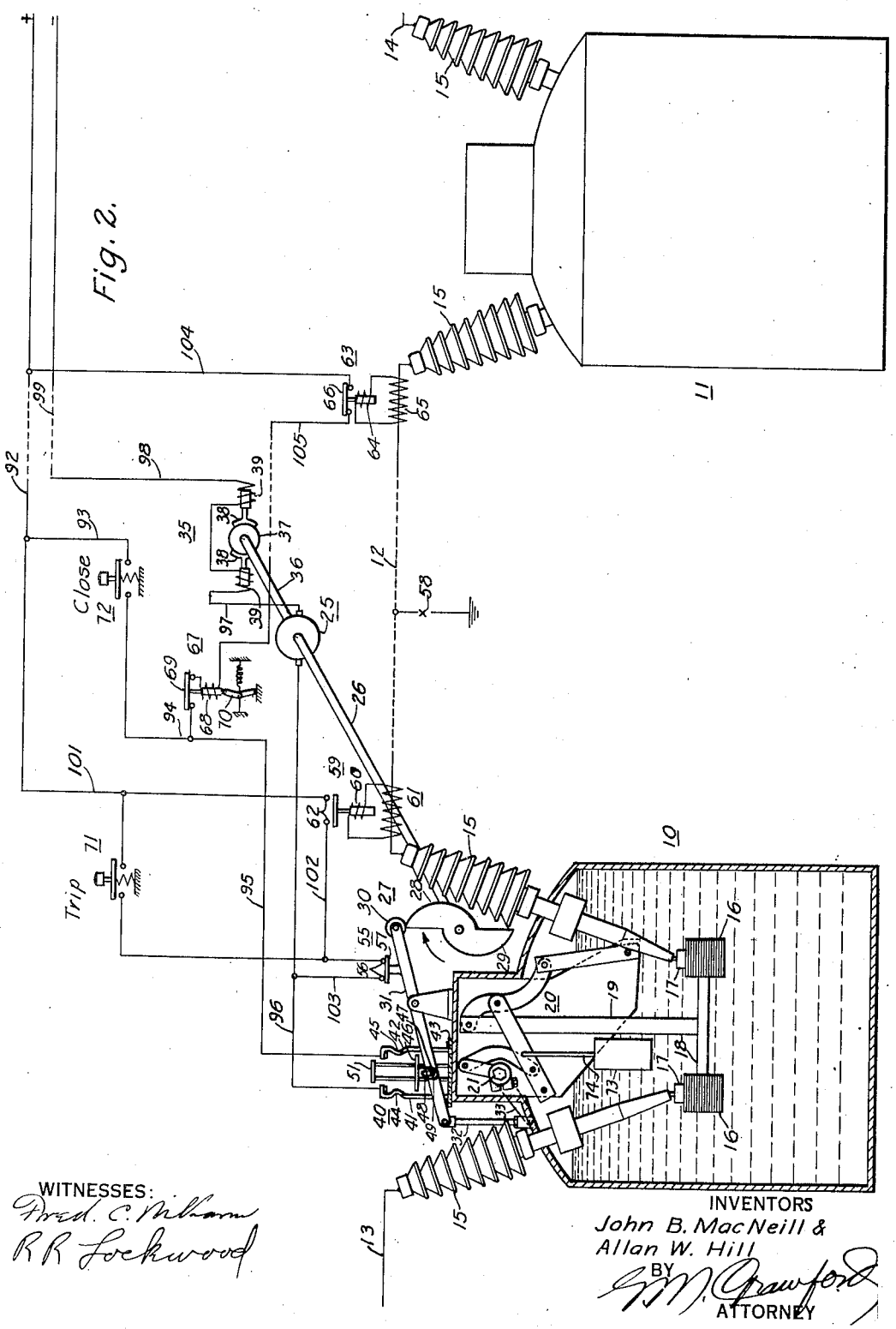
Figure 3:
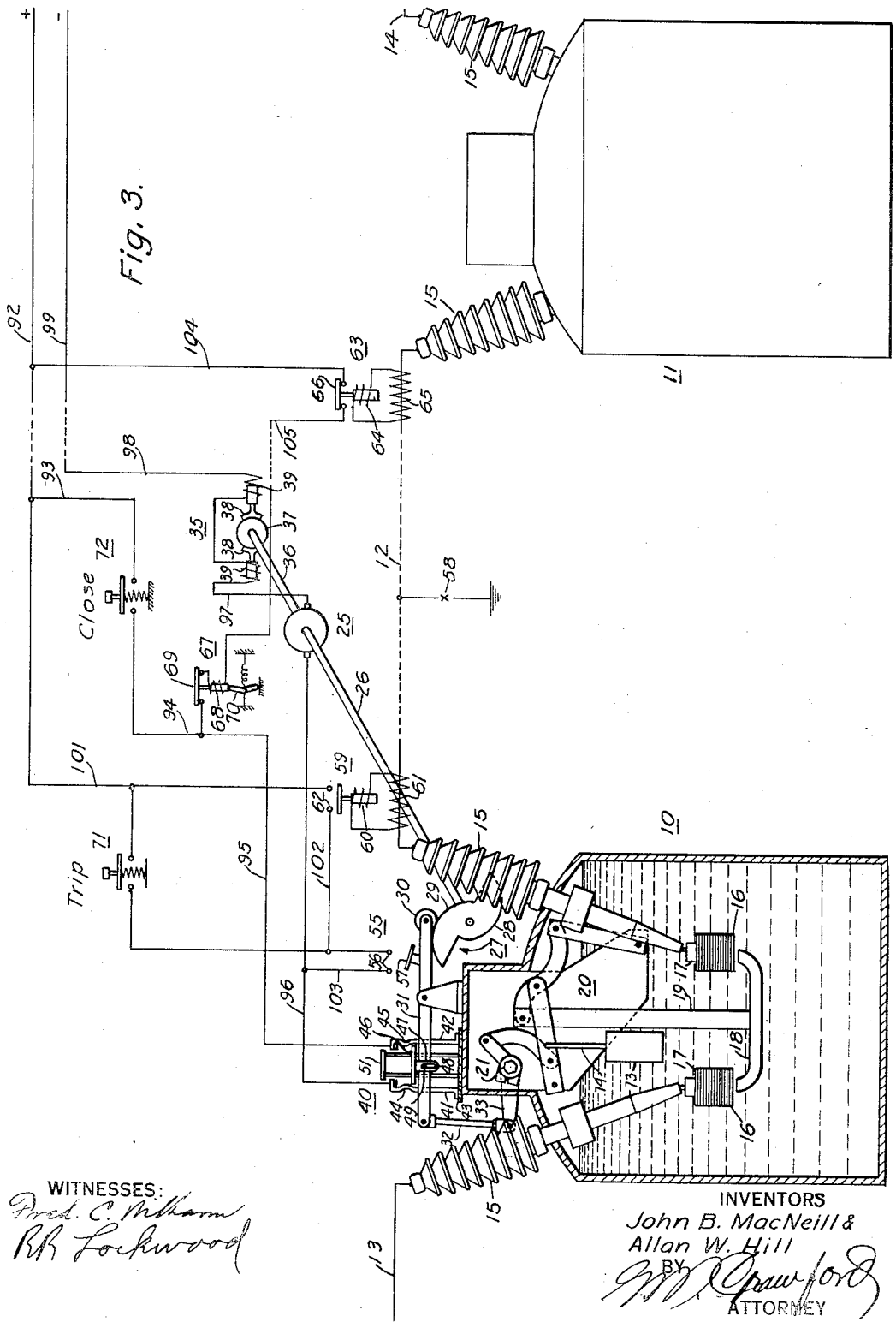

For a more complete understanding of the nature and scope of our invention, reference may be had to the following detailed description taken in connection with the accompanying drawings, in which Figures 1, 2 and 3 are diagrammatic views of apparatus and a power transmission system embodying the principal features of our invention showing the different positions of the apparatus under various operating conditions.

Figure 4:
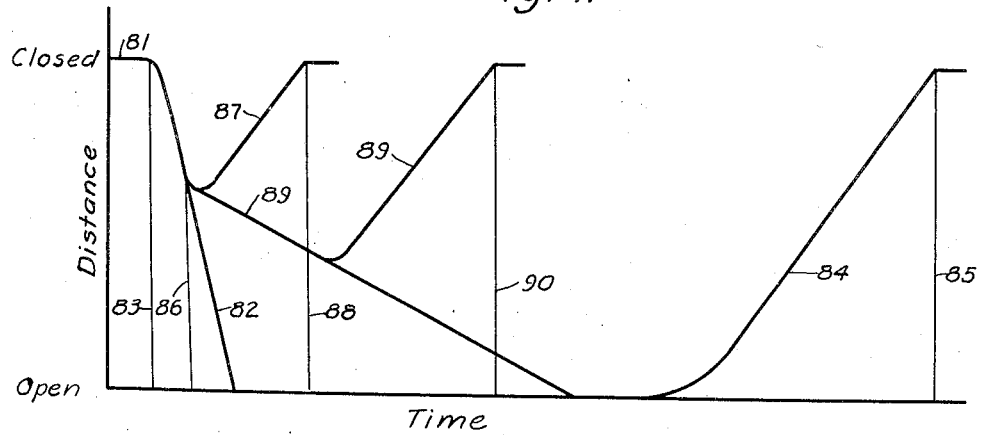
Figure 5:
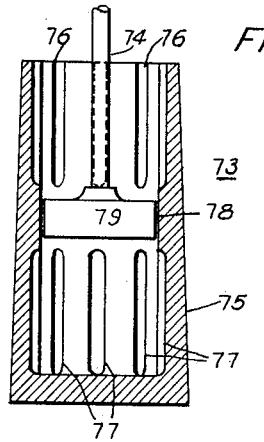

Fig. 4 shows a number of curves which demonstrate the characteristics possessed by a circuit breaker constructed in accordance with our invention, as compared with other types of circuit breaker, and Fig. 5 is an enlarged sectional view showing the construction of the dashpot, used for cushioning the movement of the circuit breaker mechanism.

Referring now particularly to Figure 1 of the drawings, the reference characters 10 and 11 designate, generally, circuit breakers which may be connected to the ends of a transmission line 12 which may be of indefinite length. It will be understood that customarily three transmission lines 12 will comprise a single transmission circuit for transmitting three phase power. However, only a single transmission line 12 is shown in order to more clearly illustrate the invention. It will be assumed that the circuit breaker 10 is located at the generating station and that the conductor 13 is connected to the station bus while circuit breaker 11 is located in the vicinity of the load to which it is connected by means of conductor 14. It will also be understood that the circuit breaker 11 may be controlled by means of a duplicate set of control equipment which will be described hereinafter in connection with circuit breaker 10.

Each of the circuit breakers 10 and 11 is provided with condenser bushings 15 of well known construction to which the conductors 12, 13 and 14 may be connected, as illustrated. The following detailed description will be especially directed to circuit breaker 10 but it will be understood that it may also apply to circuit breaker 11, the details of the construction of which are not illustrated since they may be a duplicate of those shown in connection with circuit breaker 10.

Referring now particularly to circuit breaker 10, it will be observed that the condenser bushings 15 terminate in the arc extinguishing devices 16 which may be in the form of grids or plates, as is now well known in the art, which serve to very rapidly extinguish the arc that is drawn between fixed contact member 17 and a movable contact member 18, as will be readily understood. It is desirable to provide the arc extinguishing devices 16 in order to extinguish the arc as soon as possible so that the movable contact member 18 may be reclosed after the expiration of a minimum time.

As illustrated, the movable contact member 18 is carried by a lift rod 19 which is connected to a standard operating mechanism, shown generally at 20. The operating mechanism 20 comprises a set of levers which are connected together in an obvious manner in order to provide for translating the rotary motion of a shaft 21 into a direct upward movement of the lift rod 19. The functioning of the operating mechanism 20 is obvious and, since it forms no part of the invention it will not be described in detail in the specification. It will be understood that, in the usual construction, the operating mechanism 20 is disposed at right angles to the position in which it is illustrated in the drawings in order to obtain maximum clearances between the parts of the circuit breaker to which high potentials are applied. In order to more clearly illustrate the invention, however, the operating mechanism 20 has been shown in the position illustrated.

In order to control the operation of the circuit breaker 10, a motor 25 is provided which may be of the direct current type as illustrated. The motor 25 is connected by means of a shaft 26 to drive a cam, shown generally at 27, having cam surfaces 28 and 29. As illustrated, the cam 27 is arranged to engage a roller 30 mounted on one end of an operating lever 31, the other end of which is connected by means of a connecting rod 32 to a crank arm 33 which is secured to the shaft 21.

In order to arrest further rotation of the motor 25 as soon as the current is removed therefrom, a brake, shown generally at 35, is provided and is connected to the motor 25 by means of a shaft 36. The brake 35 may comprise a brake drum 37 and brake shoes 38 which are moved out of engagement with the brake drum 37 by means of windings 39 which are connected, as illustrated, in series circuit relation with the motor 25. It will be understood that, when the motor 25 is energized, the brake 35 will be released and that, as soon as the motor 25 is deenergized, the brake 35 will be immediately applied to prevent further rotation of the motor 25 and further movement of the apparatus which it controls.

With a view to providing for initiating the reclosure of the circuit breaker when the movable contact member 18 has moved to a predetermined position, a control switch, shown generally at 40, is provided. The control switch 40 comprises a pair of contact members 41 and 42 which may be mounted on an insulating plate 43. While the contact members 41 and 42 are shown as being fixed in relation to the circuit breaker 10, it will be understood that their position may be made adjustable relative thereto, if it is so desired.

Each of the contact members 41 and 42 is provided with an inwardly extending projection 44 and 45, respectively, with which a movable contact member 46 is disposed to engage. The contact member 46 is carried by a support member 47 having a slotted opening 48 which is arranged to engage a pin 49 carried by the operating lever 31. The contact member 46 and support member 47 are slidably mounted on a guide or yoke 51 in order to maintain proper alinement with the contact members 41 and 42.

As will be set forth hereinafter in more detail, the contact member 46 is arranged to bridge the contact members 41 and 42 when the movable contact member 18 has been actuated from the closed position to a predetermined point along the path before it has reached the full open position. When the circuit breaker 10 is in the closed position, the contact members 41 and 42 are not bridged by the contact member 46. However, when the circuit breaker 10 is in the open position, as illustrated in Figure 1 of the drawings, the contact members 41 and 42 are bridged by the contact member 46, thereby completing a control circuit for the motor 25 as will be set forth more fully hereinafter.

A limit switch 55 is provided comprising fixed contact members 56 and a movable contact member 57, carried by the operating lever 31. The limit switch 55 is provided to open the circuit to the motor 25 as soon as the circuit breaker 10 has been tripped to the open position.

In order to provide for opening the circuit breaker 10 on the occurrence of a fault such as that indicated at 58 along the transmission line 12, an overload relay, shown generally at 59, is provided having an operating winding 60 connected to a current transformer 61 which may be connected to the transmission line 12 in the customary manner. The overload relay 59 is provided with contact members 62 which serve to complete a circuit for tripping the circuit breaker 10 as will be set forth in detail hereinafter. It is to be understood that any other suitable device may be employed instead of the overload relay 59 to effect the opening of the breaker under the desired condition.

With a view to providing for controlling the reclosure of the circuit breaker 10 in accordance with some condition, such, for example, as the current flow at the far end of the line, as represented by the circuit breaker 11, a control relay, shown generally at 63, is provided having an operating winding 64 connected to be energized from a current transformer 65 which is connected to the transmission line 12. The control relay 63 is provided with normally closed contact members 66 which are connected in series circuit relation with the contact members 41 and 42 of the control switch 40.

A lock-out relay, shown generally at 67, is provided having an operating winding 68 and normally closed contact members 69 connected in series circuit relation with contact members 41, 42 and 66, as illustrated. A toggle mechanism 70 is provided for holding the lock-out relay in the open position when it has once been operated.

It will be understood that any other suitable form of lock-out relay may be used and that it may be arranged to open the control circuit after two or more operations of the circuit breaker 10, as may be desired rather than after the circuit breaker 10 has reclosed a single time, as set forth in this specification.

In order to control the operation of the circuit breaker 10 manually, a "trip" switch 71 and a "close" switch 72 are provided. The control switches 71 and 72 are connected to shunt the corresponding automatic control relays in order to perform the desired function.

As has been set forth hereinbefore, the motor 25 may be energized to initiate the movement of the contact member 18 to the closed position before it has reached the full open position. Normally, the contact member 18 moves to the open position at a relatively high speed, impelled by its own weight and by means of powerful springs (not shown). When the contact member 18 is arrested in its movement to the open position and is caused to move to the closed position, the apparatus is subjected to a severe shock. In order to cushion this shock, a dashpot or shock-absorbing device, shown generally at 73, is provided and is connected, as illustrated, to the operating mechanism 20 by means of a connecting rod 74.

The dashpot 73 is more clearly illustrated in Fig. 5 of the drawings. It comprises a hollow cylindrical member 75 having two series of grooves 76 and 77 disposed on the inner surface thereof. Between the series of grooves 76 and 77 a restricted smooth cylindrical portion 78 is provided which is only slightly larger in diameter than a piston 79 which is carried by the connecting rod 74.

Ordinarily, the circuit breaker 10 is filled with oil to such an extent that the operating mechanism 20 is partly covered as shown. It will, therefore, be apparent that the dashpot 73 will be filled with oil also. The restricted portion 78 is positioned so as to generally correspond to the position of the movable contact member 18 when it will most likely be reversed in its direction of movement to reclose the circuit breaker before it has reached the full open position. It will be understood that the position of the dashpot 73 may be arranged to be adjustable so that the cushioning effect thereof may be obtained where desired.

It will be apparent that the piston 79 will be permitted to move freely in the cylinder 75 when it is above the restricted portion 78 because of the series of grooves 76 which permits the oil to flow around the piston 79. However, as soon as the piston 79 enters the restricted opening formed by the restricted portion 78, there is only a slight clearance between the outer surface of the piston 79 and the inner surface of the restricted portion 78 so that a cushioning effect is obtained which is a function of the clearance between these two surfaces. The shock to the reclosing mechanism is thereby materially lessened because of the use of the dashpot 73, thereby permitting the use of considerably less powerful and heavy parts for performing the reclosing operation.

It will be understood also that the restricted portion 78 may be positioned at such a point that normally the shock absorbing function of the dashpot 73 will be performed sufficiently in advance of the reclosing operation as to reduce the shock to a minimum. Since, in all instances, it will not be possible to exactly determine the instant when the contact member 18 will be initiated to the closed position during the opening stroke, it may be desirable to increase the length of the restricted portion 78 over a relatively longer distance than is shown in the drawings.

Referring now particularly to the curves shown in Fig. 4 of the drawings, it will be observed that the ordinates represent the travel of the moving contact 18 from the closed to the open position, distance being measured from the closed position as the upper end of the ordinate, while the abscissae represent time.

The straight portion 81 of the curve 82 represents the contact member 18 in the closed position and the ordinate 83 represents the distance through which it moves to the full open position. The curve 82 represents the time-distance characteristic of the contact member 18 if it is allowed to open in the normal manner to the full open position. The curve 84 represents the time-distance characteristic of the contact member 18 when it is reclosed under ordinary conditions with the type of circuit breakers that have been known in the prior art. Thus, the distance between the ordinates 83 and 85 represents the time interval which has been required in the prior art for reclosing the circuit breaker after it has been tripped.

As has been set forth hereinbefore, the time interval in the prior art, as represented by the distance between the ordinates 83 and 85 has been so great that it has not been possible to maintain stability on the system and synchronism in many instances.

The difference between the lengths of the ordinates 83 and 86 represents the distance through which the contact member 18 must move before it is certain that the arc formed between the contact members will be extinguished. As soon as the arc is extinguished, the contact member 18 may be reclosed without necessitating its travelling along a path as represented by the curve 82 until it has reached the full open position. In other words, assuming that the contact member 18 is caused to move toward the closed position as soon as the arc is extinguished it may follow a path which may be represented by the curve 87. The length of the time interval which occurs if the contact member 18 has been caused to follow the curve 87, may be represented by the distance between the ordinates 83 and 88. It will be readily apparent that there is considerable difference between the time intervals, as represented by the distance between the ordinates 83 and 85 as compared with the time interval represented by the distance between the ordinates 83 and 88.

In the event that conditions on the transmission line 12 or elsewhere are not such as to permit the contact member 18 to follow the curve 87, it may be arranged to follow another curve such as 89 with the result that a longer interval is required, as represented by the distance between the ordinate 83 and the ordinate 90, to again reclose the circuit breaker.

It will be understood that the dashpot 73 may be arranged to be effective at a time along the curve 87 which is represented by the intersection therewith of the ordinate 86. It will also be understood that the reduced speed of contact movement will be maintained throughout the remainder of the stroke.

In operation, the circuit breaker 10 may be closed by depressing the "close" switch 72. The motor 25 will be then energized to rotate the cam 27 for moving the contact member 18 into engagement with the stationary contact member 11.

The circuit for energizing the motor 25 may be traced from an energized conductor 92 through conductor 93, the contact members of "close" switch 72, conductors 94 and 95, contact members 42 and 41 of the control switch 40 bridged by the contact member 46, conductor 96, motor 25, conductor 97, windings 39 of the brake 35 and conductor 98 to a second energized conductor 99.

The conductors 92 and 99 may be connected to any suitable source of current such as a direct current source, as will be readily understood.

The motor 25 will rotate the cam 27 to the position illustrated in Fig. 2 of the drawings, in which position the contact member 46 of the control switch 40 will snap to the position shown, thereby de-energizing the motor 25 and applying the brake 35. The rotation of the cam 27 causes the roller 30 to follow along the cam surface 29 moving the operating lever 31, the operating mechanism 20, and the contact member 18 to their relative positions, as shown in Fig. 2. The control switch 40 is so constructed with the elongated raised portions 44 and 45 on the contact members 41 and 42, respectively, so as to maintain the motor 25 energized until the circuit breaker is in the full closed position and it also serves to effect the deenergization of the motor 25 when the roller 30 is positioned on the extreme outer end of the cam surface 29.

In the event that a fault, as at 58, occurs on the line 12, the overcurrent relay 59 will be energized to close its contact members 62, thereby completing a circuit for energizing the motor 25.

The circuit for energizing the motor 25 to trip the circuit breaker 10 may be traced from the energized conductor 92 through conductor 101, contact members 62 of relay 59, conductor 102, contact members 56 bridged by contact member 57 of the limit switch 55, conductor 103 and over a circuit which has previously been traced to energized conductor 99.

Assuming that the control relay 63 is still maintained in the energized condition, the contact member 18 will follow a path which is represented by the curve 82 in Fig. 4 of the drawings and will return to the full open position, as illustrated in Fig. 1 of the drawings. The motor 25 will be de-energized because of the opening of the limit switch 55 but it will have moved sufficiently far to permit the circuit breaker 10 to move to the full open position.

In the event that the circuit breaker 11 has also been caused to open due to the occurrence of the fault 58, current will cease to flow in the transformer 65 and the contact member 66 of control relay 63 will be closed. When the contact member 18 of the circuit breaker 10 has been moved to the position illustrated in Fig. 3 of the drawings, it will be observed that the contact member 46 of the control switch 40 is so positioned as to bridge the contact members 41 and 42. Due to the fact that the contact members 66 of the control relay 63 and contact members 69 of lock-out relay 67 are also closed, a circuit is completed for again energizing the motor 25.

The circuit for energizing the motor 25 in this instance may be traced from the energized conductor 92 through conductor 104, contact members 66 of control relay 63, conductor 105, coil 68 and contact members 69 of the lock-out relay 67, conductor 95, contact members 41 and 42 bridged by contact member 46, conductor 96 and over a circuit including the armature of motor 25, which has previously been traced, to energized conductor 99.

The cam 27 will then be rotated to a position which is illustrated in Fig. 3 of the drawings, so that the cam surface 29 engages the roller 30, at such a position that the contact member 18 is prevented from opening further and is caused to be actuated again to the closed position. The contact member 46 will remain in engagement with the stationary contact members 41 and 42 until the operating lever 31 is again moved to the position illustrated in Fig. 2 of the drawings, at which time the circuit for energizing the motor 25 will be interrupted as has been set forth hereinafter.

The flow of current through the winding 68 of the lock-out relay 67 causes contact members 69 to be actuated to the open position. This relay may be so constructed as to maintain the contact members 69 in the closed position until the desired control functions have been performed. The contact members 69 are held in the open position until the toggle mechanism 70 is reset by the operator.

It is apparent that it is unnecessary to control the operation of the circuit breaker 10 by means of the combination of the control switch 40, which operates as a function of the movement of the contact member 18, and the control relay 63, which indicates that the opposite end of the transmission line has been cleared of the fault. Either the control switch 40 or the control relay 63 may be used for initiating the reclosure of the circuit breaker 10 without necessitating the use of the other. However, it is desirable to use both of these devices in order to insure that the circuit breaker 10 is not closed at an improper time.

In view of the foregoing, it will be apparent that we have provided a control system for effecting the reclosing of a circuit breaker with sufficient rapidity to provide for the stable operation of transmission systems and to permit the disconnection and reconnection thereof without loss of synchronism. It is also apparent that we have provided for controlling this operation in accordance with the movement of the contact members of the circuit breaker and also in accordance with the conditions existing at the opposite end of the transmission line. It will be further observed that we have provided for minimizing the shock incident to the reclosing function of our circuit breaker control system, thereby permitting a more economical design in the various parts and decreasing the hazard of operation.

Since further modifications may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. A reclosing circuit breaker system comprising, in combination, a circuit breaker having relatively movable contact means disposed in operative relation, and reclosing means operatively connected to said relatively movable contact means for initiating the movement thereof to the closed position before the full open position has been reached.

2. A reclosing circuit breaker system comprising, in combination, a circuit breaker having a plurality of stationary contact members, and a movable contact member adapted to bridge said stationary contact members, and reclosing means operatively connected to said movable contact member for initiating the movement thereof to the closed position before the full open position has been reached.

3. A reclosing circuit breaker system comprising, in combination, a circuit breaker having a plurality of stationary contact members, and a movable contact member adapted to bridge said stationary contact members, and reclosing means operatively connected to said movable contact member for initiating the movement thereof to the closed position when said movable contact member reaches a predetermined position in its movement from the closed to the open position.

4. A reclosing circuit breaker system comprising, in combination, a circuit breaker having relatively movable contact members having a full open position and reclosing means operatively connected to said relatively movable contact members for initiating the movement thereof to the closed position as soon as the arc drawn between said contact members is extinguished and before said contact members have reached the full open position.

5. A reclosing circuit breaker system comprising, in combination, a circuit breaker having relatively movable contact members, reclosing means operatively connected to said movable contact members for initiating the movement thereof to the closed position before the full open position has been reached, and retarding means for decreasing the speed of opening of said movable contact members along a predetermined portion of its path of travel.

6. A reclosing circuit breaker system comprising, in combination, a circuit breaker having stationary contact members, and a movable contact member adapted to bridge said stationary contact members, reclosing means operatively connected to said movable contact member for initiating the movement thereof to the closed position when said movable contact member reaches a predetermined position in its movement from the close to the open position, and shock absorbing means for decreasing the speed of opening of said movable contact member at said predetermined position.

7. A reclosing circuit breaker system comprising, in combination a circuit breaker having a plurality of stationary contact members, a movable contact member adapted to bridge said stationary contact members and means for extinguishing the arc drawn between said contact members, reclosing means operatively connected to said movable contact member for initiating the movement thereof to the closed position when the arc drawn between said contact members is extinguished, and retarding means operatively connected to said movable contact member for reducing the speed of opening thereof when said arc is extinguished.

8. A reclosing circuit breaker system comprising, in combination, a circuit breaker having relatively movable contact members, certain of said contact members being connected to one end of a transmission line, said contact members having a closed position and a full open position, reclosing means operatively connected to said relatively movable contact members for initiating the movement thereof to the closed position before the full open position has been reached, and means for initiating the operation of said reclosing means in response to the existence of a predetermined condition at the other end of said transmission line.

9. A reclosing circuit breaker system comprising, in combination, a circuit breaker having a plurality of stationary contact members, certain of said contact members being connected to one end of a transmission system, and a movable contact member adapted to bridge said stationary contact members, reclosing means operatively connected to said movable contact member for initiating the movement thereof to the closed position when said movable contact member reaches a predetermined position in its movement from the closed to the open position, and means for initiating the operation of said reclosing means on the occurrence of a predetermined condition at the other end of said transmission system.

10. A reclosing circuit breaker system comprising, in combination, a circuit breaker having relatively movable contact members, certain of said contact members being connected to one end of a transmission system, and reclosing means operatively connected to said relatively movable contact members for initiating the movement thereof to the closed position before they have reached the full open position, and means for initiating the operation of said reclosing means on the occurrence of predetermined conditions at each end of said transmission system.

11. A reclosing circuit breaker system comprising, in combination, a circuit breaker having a plurality of stationary contact members, certain of said contact members being connected to one end of a transmission line, and a movable contact member adapted to bridge said stationary contact members, reclosing means operatively connected to said movable contact member for initiating the movement thereof to the closed position before the full open position has been reached, means for initiating the operation of said reclosing means in response to the existence of a predetermined condition at the other end of said transmission line, and retarding means for decreasing the rate of opening of said movable contact member along a predetermined portion of its path of travel.

12. A reclosing circuit breaker system comprising, in combination, a circuit breaker having relatively movable contact members, certain of said contact members being connected to one end of a transmission line, reclosing means operatively connected to said relatively movable contact members for initiating the movement thereof to the closed position before the full open position has been reached, means for initiating the operation of said reclosing means when current ceases to flow at both ends of said transmission line, and shock absorbing means operatively connected to said movable contact member for reducing the speed of opening thereof when said current ceases to flow.

13. A reclosing circuit breaker system comprising, in combination, a circuit breaker having relatively movable contact members, certain of said contact members being connected to one end of a transmission line, said contact members having a full open position, tripping means connected to be responsive to a fault on said transmission line for effecting the actuation of said movable contact member to the open position, and reclosing means for initiating the movement of the movable contact member to the closed position before the full open position has been reached.

14. A reclosing circuit breaker system comprising, in combination, a circuit breaker having relatively movable contact members, certain of said contact members being connected to one end of a transmission line, tripping means connected to be responsive to a fault on said transmission line for effecting the actuation of said relatively movable contact members to the open position, and reclosing means for initiating the movement of the movable contact member to the closed position when said movable contact member reaches a predetermined position in its movement from the closed to the open position.

15. A reclosing circuit breaker system comprising, in combination, a circuit breaker having a plurality of stationary contact members, certain of said contact members being connected to one end of a transmission line, and a movable contact member adapted to bridge said stationary contact members, tripping means connected to be responsive to a fault on said transmission line for effecting the actuation of said movable contact member to the open position, reclosing means for initiating the movement of the movable contact member to the closed position before the full open position has been reached, and means for initiating the operation of said reclosing means in response to the existence of a predetermined condition on the transmission line.

16. A reclosing circuit breaker system comprising, in combination, a circuit breaker having relatively movable contact members, certain of said contact members being connected to one end of a transmission line, tripping means connected to be responsive to a fault on said transmission line for effecting the actuation of said relatively movable contact members toward the open position, reclosing means for initiating the movement of the movable contact member to the closed position when said movable contact member reaches a predetermined position in its movement from the closed to the open position, and means for initiating the operation of said reclosing means on the occurrence of a predetermined condition at the other end of said transmission line.

17. A reclosing circuit breaker system comprising, in combination, a circuit breaker having a plurality of stationary contact members, certain of said contact members being connected to one end of a transmission line, and a movable contact member adapted to bridge said stationary contact members, tripping means connected to be responsive to the occurrence of a fault on said transmission line for effecting the actuation of said movable contact member toward the open position, reclosing means for initiating the movement of the movable contact member to the close position when said movable contact member reaches a predetermined position in its movement from the close to the open position, means for initiating the operation of said reclosing means on the occurrence of a predetermined condition at the other end of said transmission line, and shock absorbing means for reducing the speed of opening of said movable contact member along a predetermined portion of its path of travel.

18. A reclosing circuit breaker system comprising, in combination, a circuit breaker having a plurality of stationary contact members, arc extinguishing means disposed on the ends of said contact members, and a movable contact member adapted to bridge said stationary contact members and to move within said arc extinguishing means, said movable contact member having a full open position, and reclosing means operatively connected to said movable contact member for initiating the movement thereof toward the closed position when the arc is extinguished and before the full open position is reached.

19. A circuit breaker comprising, in combination, a plurality of stationary contact members, certain of said contact members being connected to one end of a transmission line, a movable contact member adapted to bridge said stationary contact members, an operating mechanism including an operating lever connected to said movable contact member, a cam disposed to engage said lever, a motor having driving connection with said cam for rotating it to actuate said movable contact member either into or out of engagement with said stationary contact members, an overload relay connected to be responsive to the current flow in said transmission line for effecting the energization of said motor to rotate said cam for actuating the movable contact member toward the open position, a control switch having contact members adapted to be bridged when the movable contact member is at a predetermined point along its path of travel, and a control relay connected to be responsive to the current flow at the other end of said transmission line and having contact members adapted to be bridged when the current ceases to flow, the contact members of said control switch and control relay being connected in series circuit relation to complete a circuit when bridged for again effecting the energization of said motor to actuate the movable contact member toward the close position before it has reached the full open position.

20. The method of operating a circuit breaker which comprises tripping the circuit breaker when it is in the closed position, reducing the rate of opening at a predetermined time in the opening cycle, and causing the reclosure of the circuit breaker to be initiated before it is permitted to reach the full open position and after the rate of opening has been reduced.

21. A reclosing circuit breaker system comprising, in combination, a circuit breaker having relatively movable contact members, and electrically-operated reclosing means operatively connected to said relatively movable contact members for initiating the movement thereof to the closed position before the full open position has been reached.

22. A reclosing circuit breaker system comprising, in combination, two electric circuits, a circuit breaker having stationary and movable contact members interconnecting said circuits, tripping means connected to be responsive to a fault on one of said circuits for effecting the operation of said movable contact member toward the open position, reclosing means for actuating the movable contact member to the closed position, and means responsive to a predetermined degree of movement of the movable contact member toward the open position for initiating the operation of the reclosing means to initiate the movement of the said movable contact member to the closed position before the full open position has been reached.

JOHN B. MacNEILL.
ALLAN W. HILL.